United States Patent [19]

Yamamoto et al.

[11] 4,081,521

[45] Mar. 28, 1978

[54] PROCESS FOR CONTINUOUSLY PRODUCING ANHYDROUS SODIUM DITHIONITE

[75] Inventors: Kousuke Yamamoto; Ahinji Takenaka; Kazuo Maeda, all of Ohmuta, Japan

[73] Assignee: Mitsui Toatsu Chemicals, Inc., Tokyo, Japan

[21] Appl. No.: 683,671

[22] Filed: May 5, 1976

[30] Foreign Application Priority Data

May 13, 1975 Japan ................................... 50-50718
Sep. 2, 1975 Japan ................................. 50-105588

[51] Int. Cl.$^2$ ............................................. C01B 17/66
[52] U.S. Cl. .................................................... 423/515
[58] Field of Search ......................... 423/515; 252/188

[56] References Cited

U.S. PATENT DOCUMENTS 2,010,615 8/1935 Vanderbilt et al. ................... 423/515
3,887,695 6/1975 Plentovich et al. .................. 423/515
3,897,544 7/1975 Maeda et al. ........................ 423/515

*Primary Examiner*—Jack Cooper
*Attorney, Agent, or Firm*—Sherman & Shalloway

[57] ABSTRACT

A process for continuously producing anhydrous sodium dithionite in the form of large granules which comprises reacting formic acid, sodium formate, sodium hydroxide and sulfurous acid anhydride in hydrous methanol using a multi-stage reaction apparatus, wherein all the required amounts of the formic acid or sodium formate, sodium hydroxide, methanol and water, and at least 60%, based on the required amount, of sulfurous acid anhydride are introduced into a first reactor, and the residence time in the first reactor is adjusted so that the conversion of the sulfurous acid anhydride to anhydrous sodium dithionite is within the range of 25 to 50%; the remainder of the sulfurous acid anhydride is introduced into a second reactor; and the reaction temperature in any given reactor is maintained at a point not lower than the reaction temperature in the immediately preceding reactor.

11 Claims, 6 Drawing Figures

PROCESS FOR CONTINUOUSLY PRODUCING ANHYDROUS SODIUM DITHIONITE

This invention relates to a process for continuously producing anhydrous sodium dithionite (to be referred to as hydrosulfite) from formic acid or sodium formate, sodium hydroxide and sulfurous acid anhydride.

Hydrosulfite is fairly unstable in an acidic condition, and decomposes to yield such compounds as acidic sodium sulfite or sodium thiosulfate. The presence of sodium thiosulfate in the reaction system acceleratingly promotes a reaction of forming sodium thiosulfate, and consequently, drastically reduces the yield of hydrosulfite.

On the other hand, under pH conditions which do not cause the decomposition of hydrosulfite, a reaction of forming hydrosulfite does not proceed satisfactorily. In order, therefore, to produce hydrosulfite, it is necessary to adjust the rate of adding the feed stock corresponding to each stage of the reaction, and to maintain the pH of the reaction system at specified values. For this reason, batchwise methods have generally been employed for the production of hydrosulfite.

Recently, a process for the continuous production of hydrosulfite was suggested (Japanese Patent Publication No. 3957/73). According to this process, a plurality of reaction tanks are used, and the reaction is carried out in such a manner that the pH of the reaction mixture in a given reaction tank does not become lower than that of the reaction mixture in a reaction tank located immediately before it, and the alcohol concentration in the final tank is maintained higher than that in the immediately preceding tank. Since water is generated as a by-product in the hydrosulfite-forming reaction, the alcohol must be added portionwise to a plurality of tanks in order to increase the alcohol concentration in the final tanks as in this method. Furthermore, in order to maintain the pH of the reaction mixture in each tank at not lower than that of the reaction mixture in the preceding tank, it is sometimes necessary to add the feed stock portionwise to all the tanks. The process is therefore complicated both in equipment and operation.

We have detailedly investigated the relation of the rate of forming hydrosulfite and the rate of forming sodium thiosulfate (the rate of decomposition of hydrosulfite) to the pH of the reaction system, the reaction temperature, the concentration of methanol, and the concentration of acidic sodium sulfite in the reaction system. This investigation led to the discovery that high purity hydrosulfite with a large particle diameter can be obtained in a high yield while greatly reducing the amount of byproduct sodium thiosulfate by continuously introducing the starting materials (formic acid or sodium formate, sodium hydroxide, and sulfurous acid anhydride) and a solvent (methanol and water) only into a first reactor of a multi-stage reaction apparatus consisting of at least two reactors, and adjusting the residence time of the reaction mixture in the first reactor so that the conversion of sulfurous acid anhydride to hydrosulfite is within the range of 25 to 50%.

We have further studied this manufacturing method, and found the following facts.

1. When sulfurous acid anhydride is added in the first and subsequent reactors in the multi-stage reaction apparatus, the pH of the reaction mixture can be greatly increased and therefore, the amount of sodium thiosulfate formed can be greatly reduced, as compared with the case of adding it only to the first reactor.

2. The particle diameter of hydrosulfite crystals as a final product depends greatly on the conversion of sulfurous acid anhydride to hydrosulfite in the first reactor.

3. There is a correlation between the reaction temperature and the purity of hydrosulfite obtained, and in order to increase its purity, moderate degrees of high temperatures and required.

The present invention has been accomplished on the basis of these facts.

It is an object of this invention therefore to provide a process for continuously producing hydrosulfite as large granules from formic acid or sodium formate, sodium hydroxide and sulfurous acid anhydride.

This object can be achieved by a process for continuous production of hydrosulfite which comprises reaction formic acid or sodium formate, sodium hydroxide and sulfurous acid anhydride in hydrous methanol using a multi-stage reaction apparatus, wherein all the required amounts of formic acid or sodium formate, sodium hydroxide, methanol and water, and not less than 60%, based on the required amount, of sulfurous acid anhydride are introduced into a first reactor, and the residence time of the materials in the first reactor is adjusted so that the conversion of the introduced sulfurous acid anhydride to hydrosulfite is within the range of 25 to 50%; the remainder of the sulfurous acid anhydride is fed into a second reactor; and the reaction temperature in any given reactor is maintained at a point not lower than that in the immediately preceding reactor.

The process of this invention includes the following two embodiments.

A. An embodiment in which substantially all the required amount of sulfurous acid anhydride is introduced into the first reactor.

B. An embodiment wherein 60 to 97% of the required amount of sulfurous acid anhydride is introduced into the first reactor, and the remainder is introduced into the second reactor.

The present invention will be specifically described below with reference to the accompanying drawings in which:

FIG. 1 shows a multi-stage reaction apparatus consisting of a first reactor and a second reactor (aging tank) which is the simplest example of apparatus suitable for performing the embodiment (A) of this invention. This embodiment is described below with reference to FIG. 1.

Figure 1:
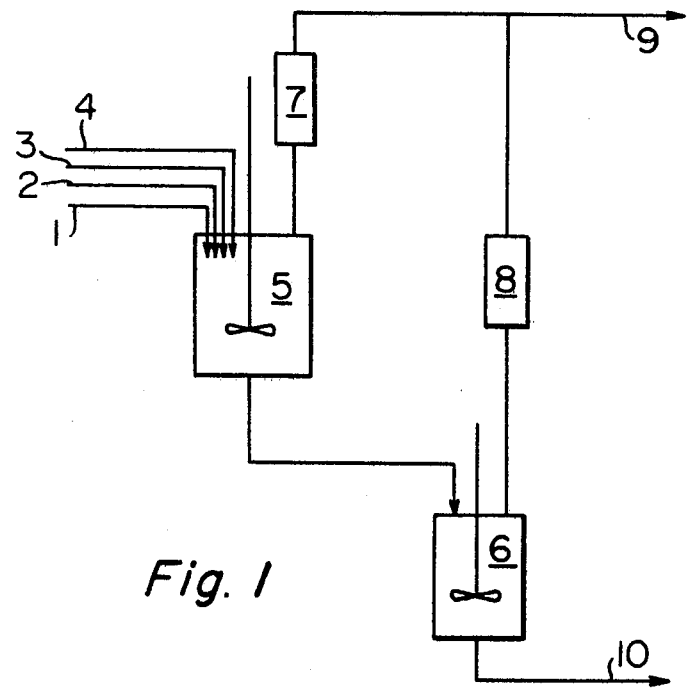
FIG. 1 is a flow chart showing one example of the performance of the present invention.

The reference numerals 1, 2, 3 and 4 represent inlet openings for an aqueous solution of methanol, sodium hydroxide, sodium formate, and sulfurous acid anhydride, respectively. The starting materials are continuously fed into a first reactor 5 through these inlet openings. These starting materials can be fed either separately or in admixture.

The composition of the starting materials is desirable within a range where the proportion of sulfurous acid anhydride is less than the theoretical proportion, and the proportion of sodium formate is larger than the theoretical proportion. For a satisfactory operation, 70 to 90 parts of sodium formate and 26 to 37 parts of sodium hydroxide are used per 100 parts by weight of sulfurous acid anhydride (all parts in this application are by weight). When the amount of sulfurous acid anhydride increases, the amount of sodium thiosulfate formed increases. On the other hand, when the amount of sodium hydroxide increases, the rate of reaction decreases, and the purity of the product becomes poor. Use of large quantities of sodium formate does not have much to do with the results of the reaction, but is economically undesirable since unreacted sodium formate must be recovered. Instead of sodium hydroxides, other alkali agents such as sodium carbonate or sodium sulfite may be used, but sodium hydroxide is best suited.

Smaller amounts of methanol are not preferred since they cause an increase in the concentration of the slurry. The slurry concentration is desirably not more than 30%. If it is less than 5%, the yield of hydrosulfite decreases. The amount of methanol is such as to maintain the slurry concentration at 5 to 30%, desirably 7 to 18%, and is 300 to 500 parts, preferably 380 to 450 parts, per 100 parts of sulfurous acid anhydride.

When the amount of water is large, the rate of forming hydrosulfite increases, and therefore, the residence time can be shortened. But at the same time, the rate of decomposition of hydrosulfite increases, and the amount of sodium thiosulfate formed increase. The optimum amount of water should be determined according to the reaction conditions, but is 0.16 to 0.43 time, especially 0.20 to 0.34 time, the weight of methanol.

The residence time in the first reactor 5 in which the conversion of sulfurous acid anhydride to hydrosulfite is in the range of 25 to 50% varies in a complicated way according, for example, to the reaction temperature, the amount of the solvent, the concentration of water, the composition of the feed stock, and the concentration of acidic sodium sulfite dissolved, but the residence time is most closely related to the reaction temperature. Accordingly, the residence time can be determined with regard to the reaction temperature. When the reaction temperature is 68° C, the residence time is 1.5 to 3.5 hours. It is 0.5 to 2.5 hours at 75° C, and 0.25 to 1.0 hour at 82° C. The residence time at other temperatures can be easily determined on the basis of its relation to the reaction temperature given above. At a temperature below 68° C, a long residence time is required, and no particular advantage is brought about. At temperatures higher than 85° C, the amount of by-product sodium thiosulfate increases, and the yield of hydrosulfite decreases. Hence, the reaction temperature in the first reactor 5 in the present embodiment is 60° to 80° C, preferably 70° to 78° C. The residence time in the first reactor 5 which ensures a conversion of 25 to 50% at reaction temperatures within this range is generally 0.3 to 3.0 hours, and at more preferred reaction temperatures, 0.5 to 1.5 hours.

The reaction pressure hardly affects the reaction, and therefore may be optional. However, it should be one which can at least maintain the reaction temperatures, and generally, it is 0 to 5 Kg/cm$^2$ gauge.

When the reaction is performed under the above conditions, the concentration of acidic sodium sulfite dissolved in the reaction mixture reaches 8 to 14%, and the pH of the reaction mixture is 4.6 to 5.1.

The hydrosulfite and acidic sodium sulfite formed in the first reactor 5 partly precipitate to form a slurry-like mixture. The slurry concentration, with regard to the amount of menthanol, is 5 to 30%, and under preferred conditions 7 to 18%, as previously stated. The concentration of hydrosulfite in the solid content of this slurry is generally 50 to 80%, and under especially preferred conditions, 65 to 75%. The remainder is acidic sodium sulfite.

The slurry leaving the first reaction tank 5 is aged in a second reactor (aging tank) 6 where the purity of hydrosulfite reaches at least 90%. The aging temperature is 75° to 87° C, and the aging time is about 1 to 4 hours. The pH of the reaction mixture is higher than that in the first reactor, and generally at least 5.5. Aging can be performed in a multiple of stages, but no substantial benefit can be gained from it. It is sufficient that the reaction in the second reactor is one which can maintain the aging temperature, and there is no need to raise the pressure further.

The hydrosulfite slurry which has been aged is then conducted by means of a conduit 10 to a post-treatment stage such as the addition of a stabilizer.

Carbon dioxide gas and methyl formate generated in the first and second reactors are cooled by a condenser 7 or 8, and led to a waste gas treating step via a conduit 9.

The hydrosulfite so obtained has a purity of at least 90% and a large uniform particle size, is convenient to use, and when dried, becomes a product with reduced dust.

In the process of this invention, it is not necessary to introduce all the required amount of sulfurous acid anhydride continuously into the first reactor alone, but sulfurous acid anhydride can be divided into portions and introduced both into the first and second reactors. When sulfurous acid anhydride is introduced portionwise, the reaction can be performed within a high pH range. This offers the advantage that the formation of by-product sodium thiosulfate can be greatly inhibited, and the reaction time can be shortened. In this case, too, the residence time in the first reactor needs to be so adjusted that the conversion of sulfurous acid anhydride to hydrosulfite in the first reactor is 25 to 50%. For this purpose, it is preferred to employ the embodiment (B) mentioned above.

Figure 2:
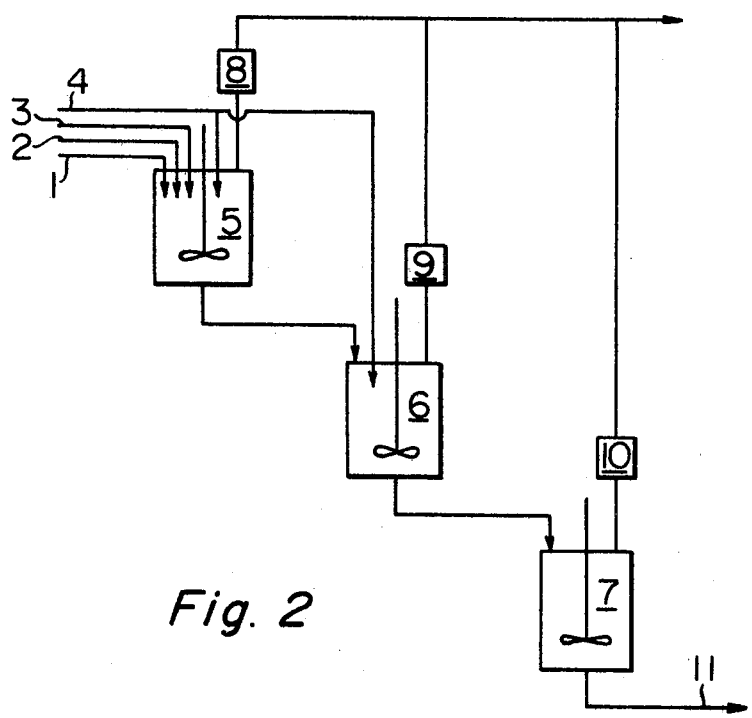
FIG. 2 is a flow chart showing another example of the performance of the present invention.

FIG. 2 shows one example of an apparatus suitable for performing the embodiment (B) of the process of this invention which is a multi-stage reaction apparatus consisting of a first reactor, a second reactor and a third reactor (aging tank).

The reference numerals 1, 2 and 3 represent inlet openings for methanol, water, sodium hydroxide and sodium formate, respectively. These materials are continuously fed into a first reactor 5 through these inlet openings. The reference numeral 4 represents an inlet opening for sulfurous acid anhydride which is divided in portions and introduced both into the first reactor 5 and the second reactor 6. These materials can be fed either singly or in admixture. For example, sulfurous acid anhydride may be added as its solution in methanol.

The composition of the feed stock, the amounts of methanol and water, and the reaction pressure are the same as in the case of the embodiment (A) described above.

The proportion of the sulfurous acid anhydride to be introduced into the first reactor can be varied within the range of 60 to 97% based on its required amount by properly selecting the composition of the feed stock, the amount of the solvent, the reaction temperature, the residence time, the concentration of water, the pH of the reaction mixture, etc. When the sulfurous acid anhydride is introduced into the first reactor in an amount of more than 97% of its required amount, there will be no substantial difference between this embodiment and the embodiment (A), and the significance of portionwise addition of sulfurous acid anhydride is reduced. On the other hand, when less than 60%, based on the required amount, of sulfurous acid anhydride is introduced into the first reactor, the conversion of sulfurous acid anhydride to hydrosulfite is low and cannot easily reach 25 to 50%. Consequently, the resulting hydrosulfite becomes fine crystals, and preferred results cannot be easily obtained. The amount of sulfurous acid anhydride to be introduced into the first reactor in order to perform this embodiment most effectively is 80 to 95% based on its required amount.

Figure 3:
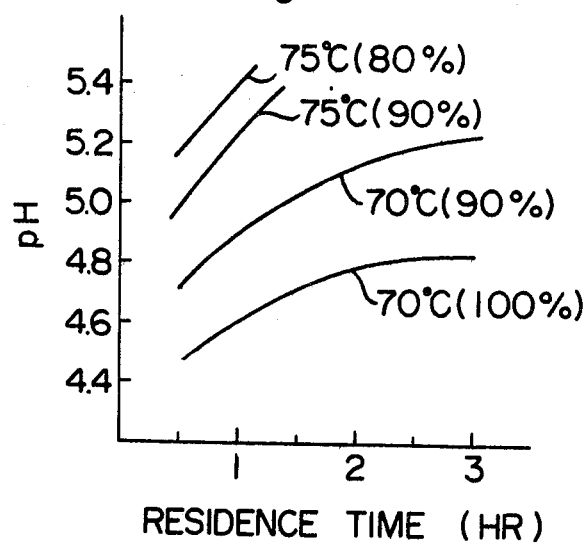
FIG. 3 is a graphic representation showing the relation between the residence time of the reaction mixture in the first reactor and the pH of the reaction mixture in the first reactor having regard to the case of adding sulfurous acid anhydride to the first reactor in an amount of 80, 90, respectively, based on its required amount at 70° and 75° C.

FIG. 3 shows one example of the relations between the residence time in the first reactor and the pH of the reaction mixture at a reaction temperature of 70° and 75° C when introducing sulfurous acid anhydride into the first reactor in an amount of 80, 90, and 100%, respectively, based on its required amount. It can be seen that the pH of the reaction mixture greatly increases when introducing sulfurous acid anhydride in an amount of 90% at 70° C, as compared with the case of introducing it in an amount of 100% at 70° C. Hence, in this case, the amount of sodium thiosulfate is greatly reduced.

Figure 4:
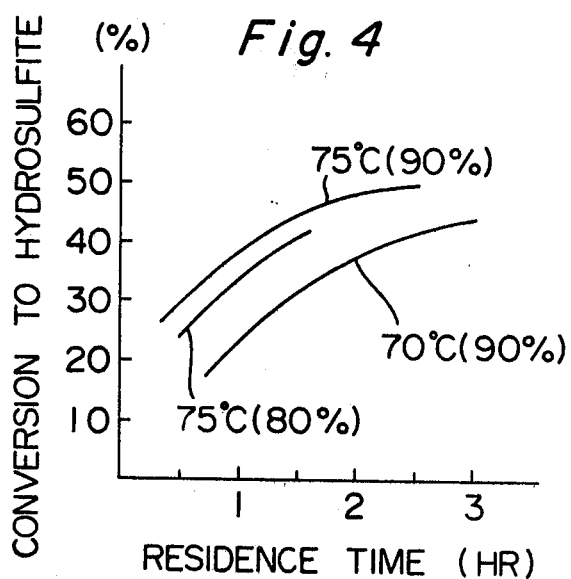
FIG. 4 is a graphic representation showing the relation between the residence time of the reaction mixture in the first reactor and the conversion of sulfurous acid anhydride to hydrosulfite in the first reactor having regard to the case of introducing sulfurous acid anhydride to the first reactor in an amount of 80 and 90%, respectively, of its required amount.

FIG. 4 shows one example of the relation between the residence time and the conversion of hydrosulfite (based on sulfurous acid anhydride; the same basis will apply hereinafter) when introducing sulfurous acid anhydride into the first reactor in an amount of 80 and 90%, respectively, based on its required amount. When the conversion to hydrosulfite in the first reactor is less than 25%, the resulting hydrosulfite becomes fine crystals with a size of less than 50 microns. In order to obtain hydrosulfite crystals having a size of at least 100 microns, it is necessary to adjust the conversion to hydrosulfite in the first reactor to at least 25%, desirably at least 30%. For this purpose, it is desirable to adjust the residence time to 1.5 hours at 70° C and 0.5 hour at 75° C when introducing sulfurous acid anhydride into the first reactor in an amount of 90% of its required amount, and to at least 0.75 hours at 75° C when introducing it into the first reactor in an amount of 80% based on its required amount. On the basis of this relation, the residence time can be determined even when the reaction temperature and the proportion of the sulfurous acid anhydride introduced into the first reactor are other than those described above.

Figure 5:
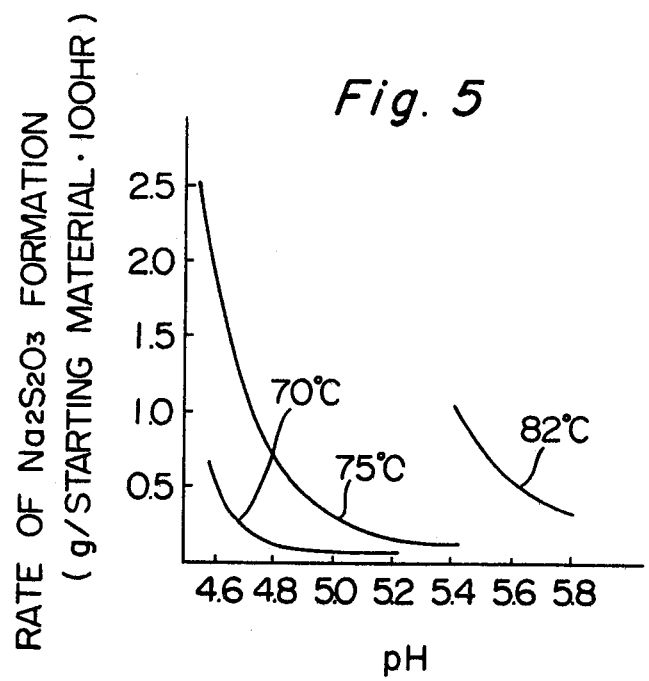
FIG. 5 is a graphic representation showing the relation between the pH of the reaction mixture and the rate of forming sodium thiosulfate at 70°, 75°, and 82° C, respectively.

Use of high temperatures is desirable in order to adjust the conversion to hydrosulfite in the first reactor to at least 25%, and shorten the residence time in the first reactor. Since, however, the relation between the reaction temperature and the rate of forming sodium thiosulfate is as shown in FIG. 5, the reaction mixture needs to be maintained at a high pH in order to inhibit the formation of by-product sodium thiosulfate at high temperatures. Accordingly, reaction temperatures higher than 80° C are not feasible. The reaction temperature in the first reactor is generally 60° to 80° C, and preferably 70° to 78° C.

In this embodiment of the process of this invention, the conversion of sulfurous acid anhydride introduced into the first reactor can be maintained at 25 to 50%, preferably 30 to 50%, by adjusting the residence time to 0.3 to 3.0 hours when the amount of sulfurous acid anhydride introduced into the first reactor is 60 to 97% of its required amount and the reaction temperature is 60° to 80° C, and by adjusting the residence time to 0.5 to 1.5 hours when the amount of the sulfurous acid anhydride introduced into the first reactor is 80 to 95% of its required amount and the reaction temperature is 70° to 78° C. Under the above reaction condition, the pH of the reaction mixture is higher than in the case of the embodiment (A), and is generally at least 4.8, and under preferred conditions at least 5.1. The resulting hydrosulfite and acidic sodium sulfite partly precipitate, and the reaction mixture becomes slurry-like. The composition of this slurry is substantially the same as in the embodiment (A).

The resulting slurry is sent to the second reactor 6. The main function of the second reactor is to introduce the remaining sulfurous acid anhydride while maintaining the reaction mixture at a high pH value, and at the same time, shorten the residence time in a third reactor (aging tank) by maximizing the conversion to hydrosulfite.

The reaction conditions in the second reactor 6 can be varied over a relatively wide range, but the following procedure is preferred.

Figure 6:
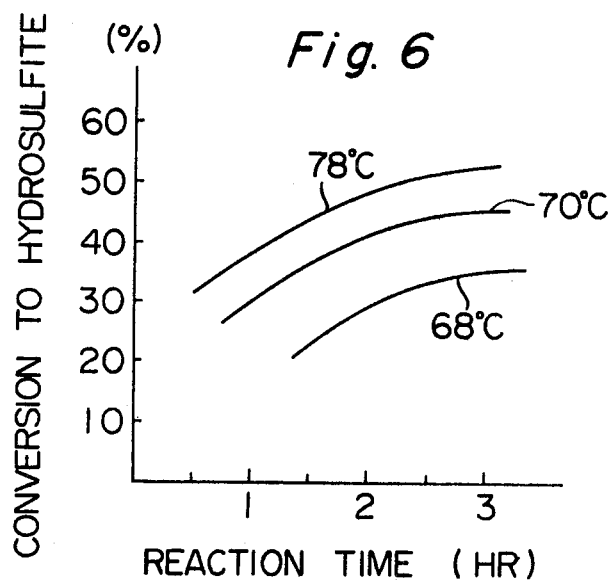
FIG. 6 is a graphic representation showing the relation between the reaction time and the conversion of sulfurous acid anhydride to hydrosulfite at 68°, 70°, and 78° C.

FIG. 6 is a graphic representation showing the general relation between the reaction time and the conversion to hydrosulfite at varying reaction temperatures. When the residence time is prolonged, the conversion to hydrosulfite approaches a constant value having regard to the reaction temperature. The value is higher with higher temperatures. For example, at 68° C, the conversion is 38%, and at 78° C, it is 55%. Accordingly, in order to raise the coversion to hydrosulfite in the second reactor, the reaction temperature is desirably maintained as high as possible, and needs to be higher than the temperature in the first reactor. The optimum temperatures ranges from 70° to 85° C, especially from 73° to 83° C.

When the residence time in the second reactor is short (that is, when the rate of introducing the remainder of sulfurous acid anhydride into the second reactor is fast), and pH of the reaction mixture is reduced excessively, and the amount of the by-product sodium thiosulfate increases. The results are therefore not satisfactory. Accordingly, the residence time in the second reactor is naturally defined as the time required to introduce the remainder of the sulfurous acid anhydride into the second reactor while maintaining the pH of the reaction mixture at a value about the same as the pH of the reaction mixture in the first reactor, that is, the pH of at least 4.9, preferable at least 5.1.

Generally, the residence time in the second reactor is long when the conversion of hydrosulfite in the first reactor is low, and short when the conversion is high. The residence time is 0.5 to 2.5 hours corresponding to the coversion of 50 to 25% in the first reactor. The residence time in the second reactor is 0.75 to 1.5 hours when the amount of sulfurous acid anhydride to be introduced into the first reactor is 80 to 95% based on its required amount, the reaction temperature in the first reactor is maintained at 70° to 78° C, and the residence time in the first reactor is adjusted to 0.5 to 1.5 hours. By performing the reaction under the above conditions, the conversion of sulfurous acid anhydride to hydrosulfite in the second reactor reaches 45 to 65%, and under preferred conditions, 50 to 62%.

Instead of feeding all the remainder of sulfurous acid anhydride left after introduction into the first reactor, a greater portion of it could be fed into the second reactor, and the remainder, into a subsequent reactor. This, however, does not bring about a significant advantage since it only results in a slight reduction in the amount of the by-product sodium thiosulfate.

The aging temperature in the third reactor 7 is about 80° to 88° C. The resience time is greatly affected by the conversion to hydrosulfite in the previous reactors, but is generally about 1 to 3 hours. The pH of the reaction mixture in the third reactor is higher than that in the second reactor, and is generally at least 5.5. The aging can be performed in a plurality of reactors, but since the conversion to hydrosulfite has been raised sufficiently in the previous reactors, the use of a plurality of aging tanks is not significantly advantageous.

In FIG. 2, the reference numeral 11 represents an outlet opening for the hydrosulfite slurry, from which the slurry is led to a post-treatment step such as the addition of a stabilizer, filtration or centrifugal separation. The reference numerals 8, 9 and 10 designate reflux condensers where methanol or methyl formate entrained by the by-product carbon dioxide is cooled and refluxed.

The hydrosulfite so obtained has a purity of at least 90% and a large uniform particle size, is convenient to handle, and when dried, gives a product that does not cause dust.

The greatest feature of the continuous production of hydrosulfite by the process of this invention including both the embodiment (A) and (B) is that the amount of by-product sodium thiosulfate is small and high purity hydrosulfite can be obtained in high yields. Another great characteristic is that the particles of hydrosulfite are large and uniform in size.

The particle size of the final product is closely related to the composition of a solid which precicipates in the early stage of the hydrosulfite-forming reaction, that is, in the first reactor in the case of a continuous process using a multiple of reactors. When the solid has a large content of acidic sodium sulfite, the particle size of the product becomes small. In order, therefore, to obtain products with a large particle size, it is necessary to reduce the content of acidic sodium sulfite.

On the other hand, the conversion of sulfurous acid anhydride in the first reactor is closely related to the content of acidic sodium sulfite in the solid precipitated in the first reactor. By maintaining the conversion at 25 to 50%, preferably 30 to 50%, the content of acidic sodium sulfite in the solid precipitated becomes less than 50%, and under preferred conditions, less than 35%. This leads to the production of hydrosulfite having a large particle size (120 to 200 microns). When this product is aged, the particle size becomes uniform, and the purity of the product increases to at least 90%.

In the conventional batchwise processes, acidic sodium sulfite is the only solid product in the early stage of the reaction, and the further performance of the reaction only results in very fine particles (less than 50 microns) of hydrosulfite.

The process of this invention has further advantages enumerated below.

1. The pH of the reaction mixture can be controlled easily. Thus, stable operability can be achieved, and a product of uniform quality can be obtained.

2. Except for sulfurous acid anhydride in embodiment (B), all reaction materials and the solvents can be added only to the first reactor alone, and there is no need to add them dividedly to all the reactors. Hence, the process can be controlled easily, and the reaction apparatus can be simplified.

3. Since the product has a large and uniform particle size, steps ranging from recovery by filtration up to packaging can be performed continuously.

The following Examples specifically illustrate the present invention.

EXAMPLE 1

A 1-liter first reactor equipped with a jacket and a reflux condenser using ice water was continuously charged hourly with 96.2 g of a 54.4% aqueous solution of sodium formate, 327 g of a solution consisting of 87.6% of methanol, 6.2% of water and 6.2% of sodium hydroxide, and 67.4 g of sulfurous acid anhydride. With stirring, the mixture was allowed to reside in it for 2.0 hours at a reaction temperature of 78° C and a reaction pressure of 2.0 Kg/cm$^2$. The conversion of sulfurous acid anhydride to hydrosulfite at this time was 46.5%, and the slurry concentration was 13.5%. The solid separated by filtration and dried was analyzed, and found to contain 73.67% of hydrosulfite, 0.11% of sodium thiosulfate, 23.00% of acidic sodium sulfite and 3.16% of sodium formate. The pH of the reaction mixture was 4.96.

While maintaining the above residence time, the slurry-like reaction product was continuously withdrawn from the first reactor, and continuously fed into a 2-liter second reactor of the same type (aging tank) where it was aged at 82° C with a residence time of about 3 hours.

After the aging, the resulting slurry was continuously withdrawn, and cooled to 60° C. The crystals were separated, washed, and dried to afford hydrosulfite having a purity of 91% at a rate of 74.4 g/hour.

The yield of hydrosulfite was 73.8% based on the sulfurous acid anhydride, and 50.5% based on the sodium formate. The resulting hydrosulfite was in the form of uniform crystalline granules having a particle size of 130 to 140 microns.

EXAMPLE 2

A multi-stage reaction apparatus of the same type as in Example 1 was used which consisted of first to fourth reactors, of which the third and fourth reactors were aging tanks.

A 54.4% aqueous solution of sodium formate, methanol, a 50% aqueous solution of sodium hydroxide, and sulfurous acid anhydride were fed continuously to the first reactor at a rate of 80.2 g/hour, 238.4 g/hour, 33.74 g/hour, and 50.58 g/hour, respectively, and reacted at 75° C with a residence time of 2.5 hours. The conversion of sulfurous acid anhydride to hydrosulfite was 36.5%. The purity of hydrosulfite in the precipitated solid was 66%.

The slurry formed in the first reactor was fed continuously into the second reactor into which sulfurous acid anhydride was fed at a rate of 5.62 g/hour, and the residence time in the second reactor was adjusted to 0.5 hour. The pH of the reaction mixture was 4.85.

The slurry obtained was aged in the third and fourth reactors at a temperature of 80° C with a residence time of 1.5 hours in each tank. The reaction mixture in the third reactors (first aging tank) had a pH of 5.7, and the reaction mixture in the fourth reactor (second aging tank) had a pH of 6.0.

The resulting hydrosulfite had a purity of 90%, and its yield was 71.8% based on the sulfurous acid anhydride. Substantially the same as in Example 1, the resulting hydrosulfite crystals were uniform crystalline particles.

EXAMPLE 3

Three 2-liter reactors equipped with a jacket and a reflux condenser using ice water were set up as shown in FIG. 2.

A 54.4% aqueous solution of sodium formate, a solution consisting of 6.2% of sodium hydroxide, 6.2% of water and 87.6% of methanol, and sulfurous acid anhydride were continuously fed into a first reactor at a rate of 124 g/hours, 421 g/hour, and 78 g/hour, respectively, and with stirring reacted at a temperature of 75° C and a pressure of 1.0 Kg/cm$^2$ with a residence time of 0.75 hour. The pH of the reaction mixture at this time was 5.1±0.1, and the conversion of sulfurous acid anhydride to hydrosulfite was 35.0%.

While maintaining the above residence time, the resulting slurry was continuously withdrawn from the first reactor, and fed continuously into a second reactor. Separately, sulfurous acid anhydride was introduced into the second reactor at a rate of 9 g/hour. The slurry was reacted at 78° C with a residence time of 0.75 hour. The pH of the reaction mixture at this time was 5.1±0.1 as in the first reactor. The conversion to hydrosulfite in the second reactor was 52.5%.

The slurry that left the second reactor was fed continuously into a third reactor (aging tank), and aged at 83° C for 2 hours. After the aging, the slurry was continuously withdrawn, and cooled to 60° C. The crystals were collected by filtration. The hydrosulfite crystals collected were washed with 3 to 4 times their weight of methanol, and dried. Hydrosulfite having a purity of 91.5% was obtained at a rate of 96.0 g/hour.

The yield of the hydrosulfite was 74.2% based on the sulfurous acid anhydride, and 51.0% based on the sodium formate. The resulting hydrosulfite was in the form of uniform crystalline granules with a size of 140 to 150 microns.

EXAMPLE 4

The same procedure as in Example 3 was repeated except that the residence time in the second reactor was changed to 1.25 hours. The pH of the reaction mixture in the second reactor was 5.2±0.1, and the conversion to hydrosulfite was 58%. Then, the reaction mixture was aged at 85° C for 2 hours in the third reactor, and post-treated in the same way as in Example 3.

The resulting hydrosulfite was in the form of uniform crystalline granules having a particle size of 140 to 150 microns and a purity of 90.8%. The yield was 74.4% based on the sulfurous acid anhydride.

EXAMPLE 5

Except that the rate of charging sulfurous acid anhydride was changed to 83 g/hour, the reaction in the first reactor was carried out in the same way as in Example 3 at a temperature of 75° C with a residence time of 1.25 hours. At this time, the pH of the reaction mixture was 5.1±0.1, and the conversion of sulfurous acid anhydride to hydrosulfite was 44%. The resulting slurry was continuously withdrawn, and continuously fed into the second reactor. In the second reactor, sulfurous acid anhydride was introduced separately at a rate of 4 g/hour, and the reaction was performed at 78° C with a residence time of 1 hour. The pH of the reaction mixture was 5.2±0.1, and the conversion of sulfurous acid anhydride to hydrosulfite was 56%. The reaction mixtue was subsequently aged in the third reactor at 83° C with a residence time of 2 hours, and post-treated in the same way as in Example 3.

The resulting hydrosulfite was in the form of uniform crystalline granules having a particle size of 140 to 150 microns and a purity of 90.5%. The yield was 74.2% based on the sulfurous acid anhydride.

EXAMPLE 6

The reaction was carried out in the first reactor at 75° C with a residence time of 0.75 hour in the same way as in Example 3 except that the rate of charging sulfurous acid anhydride was changed to 61 g/hour. The pH of the reaction mixture was 5.4±0.1, and the conversion of sulfurous acid anhydride to hydrosulfite was 23%. The slurry formed was continuously withdrawn, and continuously fed into the second reactor. Separately, sulfurous acid anhydride was introduced into the second reactor at a rate of 26 g/hour, and the reaction was carried out at 78° C with a residence time of 1.25 hours. At this time, the pH of the reaction mixture was 5.0 ± 0.1, and the conversion of sulfurous acid anhydride to hydrosulfite was 50.3%. Then, the reaction mixture was aged in the third reactor at 83° C with a residence time of 2 hours, and post-treated in the same way as in Example 3.

The resulting hydrosulfite was in the form of crystals having a particle size of 130 to 150 microns and a purity of 88.7%. The yield was 70.8% based on the sulfurous acid anhydride.

What we claim is:

1. A process for continuously producing anhydrous sodium dithionite by the reaction between formic acid or sodium formate, sodium hydroxide and sulfurous acid anhydride in hydrous methanol in at least two reactors, said process comprising introducing into a first reactor a reaction mixture comprising all the sulfurous acid anhydride, formic acid or sodium formate, sodium hydroxide, methanol and water used to effect the production of anhydrous sodium dithionite, maintaining said reaction mixture in said first reactor at temperature of from 60° to 80° C. and for a residence time sufficient to convert from about 25 to 50% of the sulfurous acid anhydride to sodium dithionite wherein the pH of the reaction mixture in said first reactor is maintained in the range of 4.6 to 5.1; feeding the reaction mixture, at the end of said residence time, into a second reactor; maintaining the temperature of the reaction mixture in said second reactor at a temperature higher than that of said first reactor, in the temperature range of from 75° to 87° C, for a residence time from 1 to 4 hours whereby the pH of the reaction mixture in said second reactor is maintained at at least 5.5.

2. The process of claim 1 wherein in the first reactor, the reaction temperature is 70° to 78° C and the residence time is 0.5 to 1.5 hours.

3. The process of claim 1 wherein the reaction mixture introduced into the first reactor comprises, per 100 parts by weight of sulfurous acid anhydride, 70 to 90 parts by weight of formic acid or sodium formate, 26 to 37 parts by weight of sodium hydroxide and 300 to 500 parts by weight of methanol and 0.16 to 0.43 times the weight of methanol, of water.

4. A process for continuously producing anhydrous sodium dithionite by the reaction between formic acid or sodium formate, sodium hydroxide and sulfurous acid anhydride in hydrous methanol in at least three reactors, said process comprising introducing into a first reactor a reaction mixture comprising all the formic acid or sodium formate, sodium hydroxide, methanol and water used to effect the production of anhydrous sodium dithionite, and from 60 to 97% by weight of the amount of sulfurous acid anhydride that is required to react with said formic acid or sodium formate, and sodium hydroxide in hydrous methanol, that is added to the first reactor;

maintaining said reaction mixture in said first reactor at a temperature of from 60° to 80° C. and for a residence time sufficient to convert from about 25 to 50% of the sulfurous acid anhydride to sodium dithionite whereby the pH of the reaction mixture in said first reactor is maintained at at least 4.8; feeding the reaction mixture, at the end of said residence time, and the remaining 40 to 3% by weight of the sulfurous acid anhydride, that is required to react with said formic acid or sodium formate, and sodium hydroxide in hydrous methanol, that is added to the first reactor, into a second reactor;

maintaining the temperature of the reaction mixture in said second reactor at a temperature higher than that of said first reactor, in the temperature range of from 70° to 85° C, for a residence time sufficient to convert from about 45 to about 65% of the sulfurous acid anhydride that is required to react with said formic acid or sodium formate, and sodium hydroxide in hydrous methanol that is added to the first reactor to sodium dithionite, wherein the pH of the reaction mixture in said second reactor is maintained at at least 4.9;

feeding the reaction mixture from said second reactor, at the end of said residence time, into a third reactor; and maintaining the temperature of the reaction mixture in said third reactor at a temperature higher than that of said second reactor, in the temperature range of from 80° to 88° C, for a residence time of from 1 to 3 hours.

5. The process of claim 4 wherein the residence time of the reaction mixture in said first reactor is in the range of from 0.3 to 3.0 hours.

6. The process of claim 5 wherein the residence time of the reaction mixture in the second reactor is in the range of from about 0.5 to 2.5 hours.

7. The process of claim 4 wherein the reaction mixture in said first reactor is maintained at a temperature of from 70° to 78° C. for residence time of from 0.5 to 1.5 hours sufficient to convert from 30 to 50% of the sulfurous acid anhydride to sodium dithionite wherein the pH of said reaction mixture in said first reactor is maintained at at least 5.1.

8. The process of claim 7 in which from 80 to 95% by weight of the amount of sulfurous acid anhydride that is required to react with said formic acid or sodium formate, and sodium hydroxide in hydrous methanol that is added to the first reactor, is introduced into said first reactor, and wherein the reaction mixture in the first reactor, at the end of said residence time, and from 5 to 20% by weight of the amount of sulfurous acid anhydride that is required to react with said formic acid or sodium formate, sodium hydroxide in hydrous methanol, that is added to the first reactor, are fed into the second reactor, the reaction mixture in said second reactor is maintained at a temperature higher than that of said first reactor, in the temperature range of from 73+ to 83° C for a residence time of from 0.75 to 1.5 hours sufficient to convert from 50 to 62% of the sulfurous acid anhydride that is required to react with said formic acid or sodium formate, and sodium hydroxide in hydrous methanol that is added to the first reactor, wherein the pH of the reaction mixture in said second reactor is maintained at at least 5.1.

9. The process of claim 4 wherein the sulfurous acid anhydride is introduced into the first reactor in an amount of 80 to 95% of the amount of sulfurous acid anhydride required to react with the formic acid or sodium formate, and sodium hydroxide in hydrous methanol that is added to the first reactor.

10. The process of claim 9 wherein the conversion of the sulfurous acid anhydride to anhydrous sodium dithionite in the first reactor is 30 to 50%.

11. The process of claim 4 wherein the residence time in the second reactor is adjusted so that the conversion of the sulfurous acid anhydride to anhydrous sodium dithionite in the second reactor is within 50 to 62% based on the total amount of sulfurous acid anhydride fed to the first and second reactors.

* * * * *

UNITED STATES PATENT OFFICE
CERTIFICATE OF CORRECTION

Patent No. 4,081,521      Dated March 28, 1978

Inventor(s) Kousuke Yamamoto et al.

It is certified that error appears in the above-identified patent and that said Letters Patent are hereby corrected as shown below:

Figure 5, should appear as shown on the attached sheet.

Signed and Sealed this

Eighth Day of August 1978

[SEAL]

Attest:

RUTH C. MASON  
*Attesting Officer*

DONALD W. BANNER  
*Commissioner of Patents and Trademarks*

UNITED STATES PATENT OFFICE
CERTIFICATE OF CORRECTION

Patent No. 4,081,521        Dated March 28, 1978

Inventor(s) Yamamoto, et al.

It is certified that error appears in the above-identified patent and that said Letters Patent are hereby corrected as shown below:

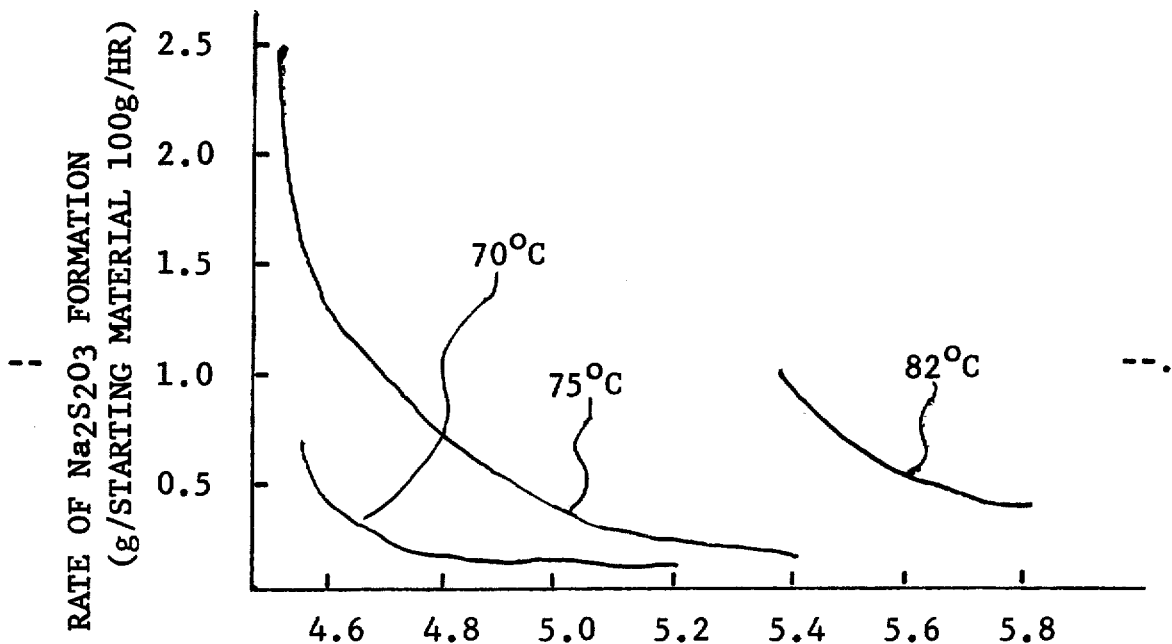

Fig. 5